US008605231B2

United States Patent
Chang

(10) Patent No.: US 8,605,231 B2
(45) Date of Patent: Dec. 10, 2013

(54) DIGITAL PHOTO FRAME WITH NATURAL LIGHT

(75) Inventor: Jen-Tsorng Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 1091 days.

(21) Appl. No.: 12/579,509

(22) Filed: Oct. 15, 2009

(65) Prior Publication Data

US 2010/0277667 A1 Nov. 4, 2010

(30) Foreign Application Priority Data

Apr. 29, 2009 (CN) .......................... 2009 1 0301988

(51) Int. Cl.
*G02F 1/1335* (2006.01)
(52) U.S. Cl.
USPC .............................................. 349/62; 349/65
(58) Field of Classification Search
USPC .............................................. 349/58, 61–65
See application file for complete search history.

(56) References Cited

U.S. PATENT DOCUMENTS

| 6,532,152 B1* | 3/2003 | White et al. .................. 361/692 |
| 2003/0081902 A1* | 5/2003 | Blauvelt et al. ................. 385/50 |

FOREIGN PATENT DOCUMENTS

| CN | 1670586 A | 9/2005 |
| CN | 1831610 A | 9/2006 |

OTHER PUBLICATIONS

English machine translation of CN 1831610.*

* cited by examiner

*Primary Examiner* — Edward Glick
*Assistant Examiner* — David Chung
(74) *Attorney, Agent, or Firm* — Altis Law Group, Inc.

(57) ABSTRACT

A digital photo frame includes a frame, a light gathering lens, a reflector, and a transmissive LCD module. The frame includes a front side, a rear side, and a receiving hole through the front side and rear side. The light gathering lens array is pivotedly mounted on the rear side of the frame, the light gathering lens array being rotatable about two upper pivot pins. The reflector is pivotedly mounted on the rear side of the frame corresponding to the light gathering lens array, the reflector being rotatable about two lower pivot pins parallel to the upper pivot pins. The transmissive LCD module is received in the receiving hole adjacent to the front side.

6 Claims, 4 Drawing Sheets

DIGITAL PHOTO FRAME WITH NATURAL LIGHT

BACKGROUND

1. Technical Field

The present disclosure relates to a digital photo frame and, particularly, to a digital photo frame with natural light.

2. Description of Related Art

A digital photo frame is an electronic device which can display text, image, and video. Current digital photo frames typically employ a light source which consumes significant great amount of electric power.

Therefore, a digital photo frame with natural light to overcome the above-described problems are desired.

DETAILED DESCRIPTION

Embodiments of the present digital photo frame will now be described in detail with reference to the drawings.

Figure 1:
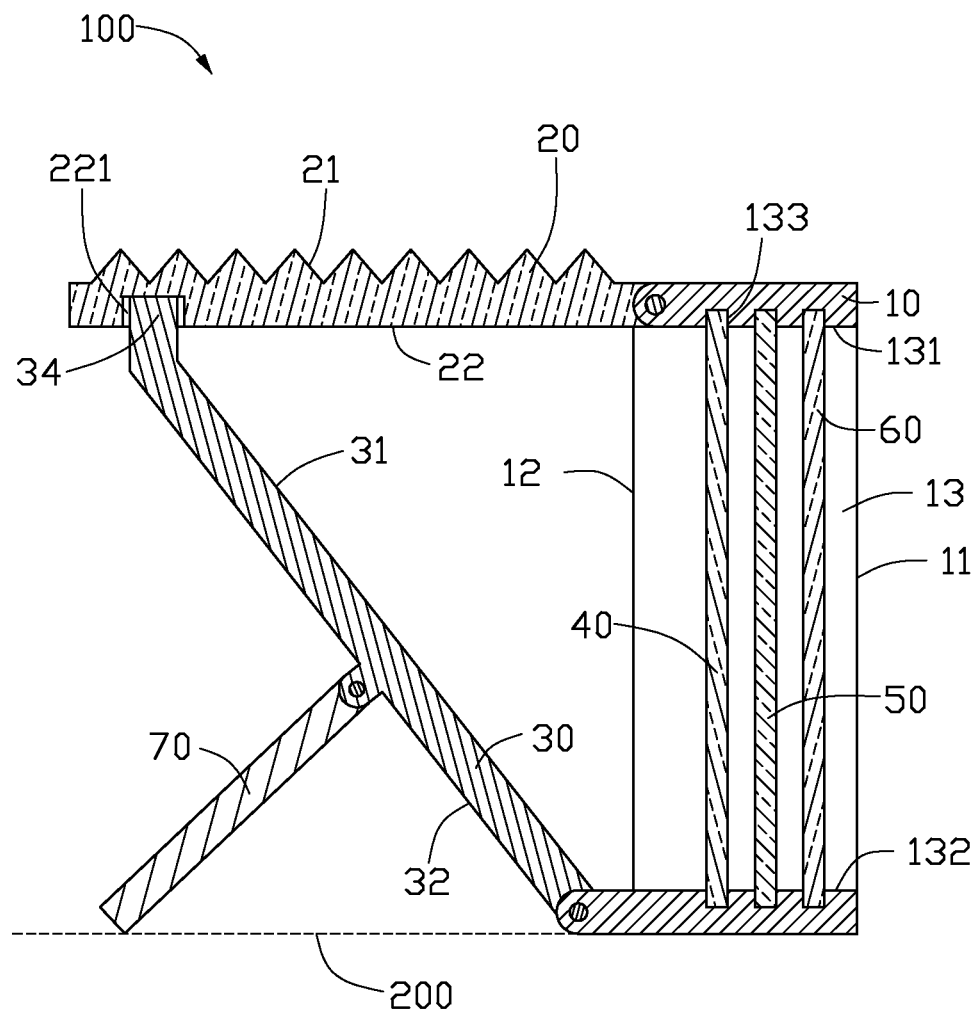
FIG. 1 is a schematic, cross-sectional of a digital photo frame, according to the present disclosure.
Figure 2:
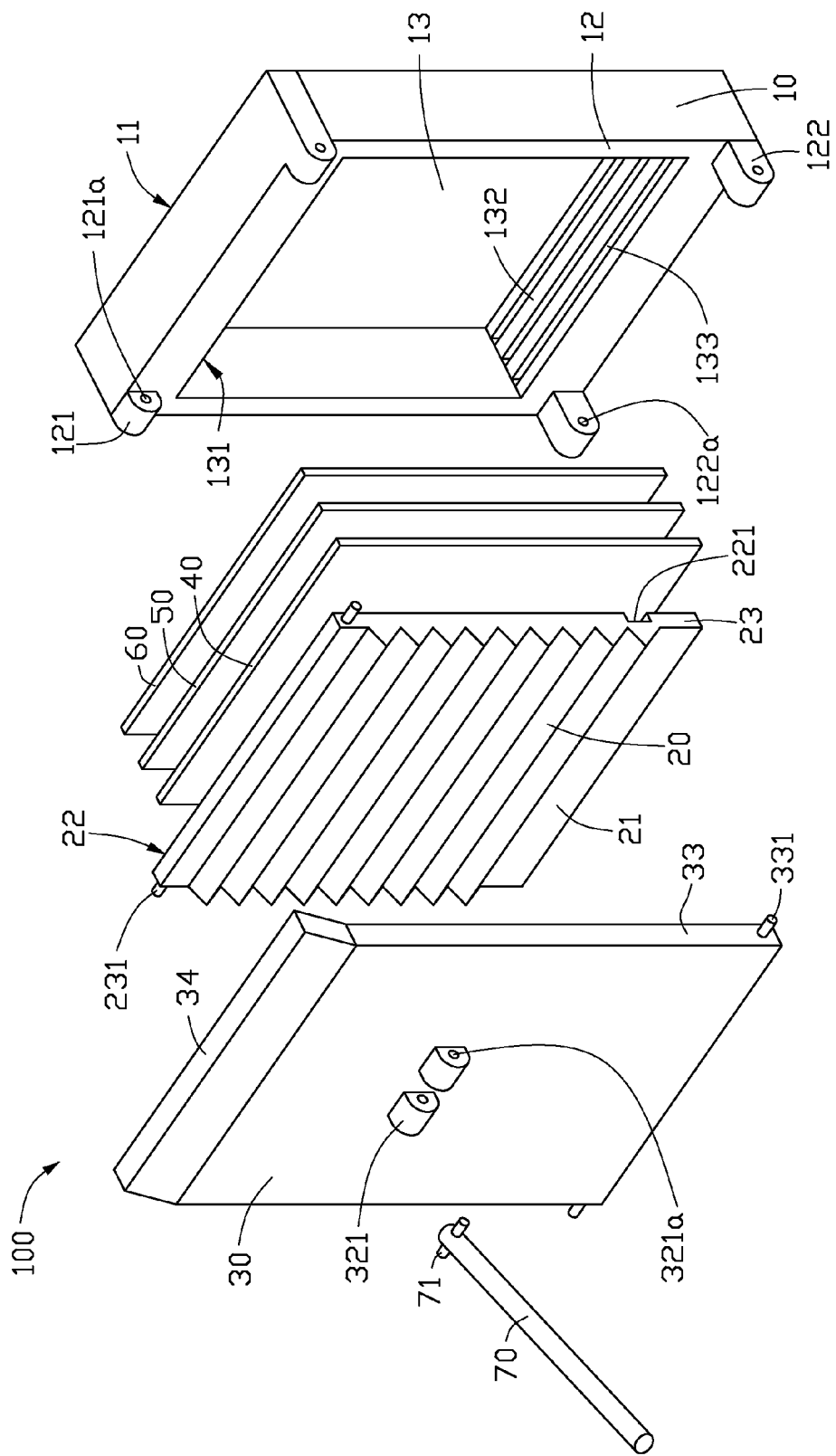
FIG. 2 is an isometric, exploded view of the digital photo frame of FIG. 1.

Referring to FIGS. 1-2, a digital photo frame 100, according to an exemplary embodiment, includes a frame 10, a light gathering lens array 20, a reflector 30, an optical film layer 40, a diffuser 50, a transmissive LCD module 60, and a support member 70.

The frame 10 is rectangular and includes a front side 11, a rear side 12 facing away the front side 11. The frame 10 defines a rectangular receiving hole 13 through the front side 11 and the rear side 12. The frame 10 forms two upper joint members 121 on two opposite corners of the top of the rear side 12, and two lower joint members 122 on two opposite corners of the bottom of the rear side 12. In detail, each one of the upper joint members 121 and the lower joint members 122 is a half of cylinder and respectively defines an upper through hole 121a and a lower through hole 122a through the longitude direction thereof. The upper through holes 121a of the upper joint members 121 are aligned with each other and thereby define an upper pivot axis. The lower through holes 122a of the lower joint members 122 are aligned with each other and thereby define a lower pivot axis. In addition, the receiving hole 13 includes an upper inner surface 131 adjacent to the upper joint members 121, and a lower inner surface 132 adjacent to the lower joint members 122. The frame 10 respectively defines three receiving grooves 133 on the upper inner surface 131 and lower inner surface 132. Each of the receiving grooves 133 extends generally along a direction parallel to the length of the upper inner surface 131 and the lower inner surface 132. In this embodiment, the width of the side included lower inner surface 132 is greater than the width of the side included upper inner surface 131.

The light gathering lens array 20 is rectangular and includes an light inputting surface 21, a light emitting surface 22, and four first sidewalls 23. The light gathering lens 20 is configured for condensing and directing light rays impinging on the light inputting surface 21 and emitting from the light emitting surface 22. The width of the light gathering lens array 20 is slightly less than the distance between the two upper joint members 121. Two upper pivot pins 231 respectively protrude outwardly from two opposite first sidewalls 23 correspondingly. In particular, each of the upper pivot pins 231 is on the corner of the first sidewall 23 and is shaped corresponding to the upper through holes 121a. In addition, the light gathering lens array 20 defines a locating groove 221 in the emergent face 22 far away the upper joint members 121. In this embodiment, the light gathering lens 20 is a Fresnel lens.

The reflector 30 is a plate and includes a reflecting surface 31, a back surface 32, and four second sidewalls 33. The reflecting surface 31 is configured for reflecting the light rays transmitted from the light gathering lens 20. The width of the reflector 30 is slightly less than the distance between the two lower joint members 122. Two lower pivot pins 331 protrude outward from two opposite second sidewalls 33 respectively, adjacent to the bottom thereof and are shaped corresponding to the lower through holes 122a. The reflector 30 perpendicularly extends outward two support joint members 321 from the back surface 32, each of which is a half of cylinder and defines a support through hole 321a through the longitude direction thereof. The support through holes 321a of the support joint members 121 are aligned with each other and thereby define a support pivot axis. In addition, the reflector 30 extends outward a flange 34 from the top thereof, which is bent towards the reflecting surface 31.

The optical film layer 40, such as a light-enhancing film, is configured for reducing reflection and improving transmission to the light rays reflected from the reflector 30.

The diffuser 50 is a rectangular plate that diffuses and thereby homogenizes the light rays from the optical film layer 40.

The transmissive LCD module 60 is a thin, flat panel used for electronically displaying information such as text, images, or video based upon video signals. In this embodiment, the transmissive LCD module 60 is a thin film technology (TFT) type of LCD.

The support member 70 is a rod and configured for supporting the reflector 30. The diameter of the support member 70 is slightly less than the distance between the two support joint members 321. Two support pivot pins 71 extend outward along two opposite directions from the sidewall of the support member 70 correspondingly and adjacent to one end of the support member 70.

In assembly, the optical film layer array 40, the diffuser 50, and the transmissive LCD module 60 are received in the receiving hole 13 from the rear side 12 to the front side 11, and have two ends thereof accommodated within the spacing grooves 133. As such the optical film layer array 40, the diffuser 50, and the transmissive LCD module 60 are framed by the frame 10. The upper pivot pins 231 of the light gathering lens 20 are sleeved in the upper through holes 121a of the upper joint members 121. The light gathering lens array 20 can rotate to receive in the receiving hole 13. The lower pivot pins 331 of the reflector 30 are sleeved in the lower through holes 122a of the lower joint members 122. The support pivot pins 71 of the support member 70 are sleeved in the support through holes 321a of the support joint members 321.

Figure 3:
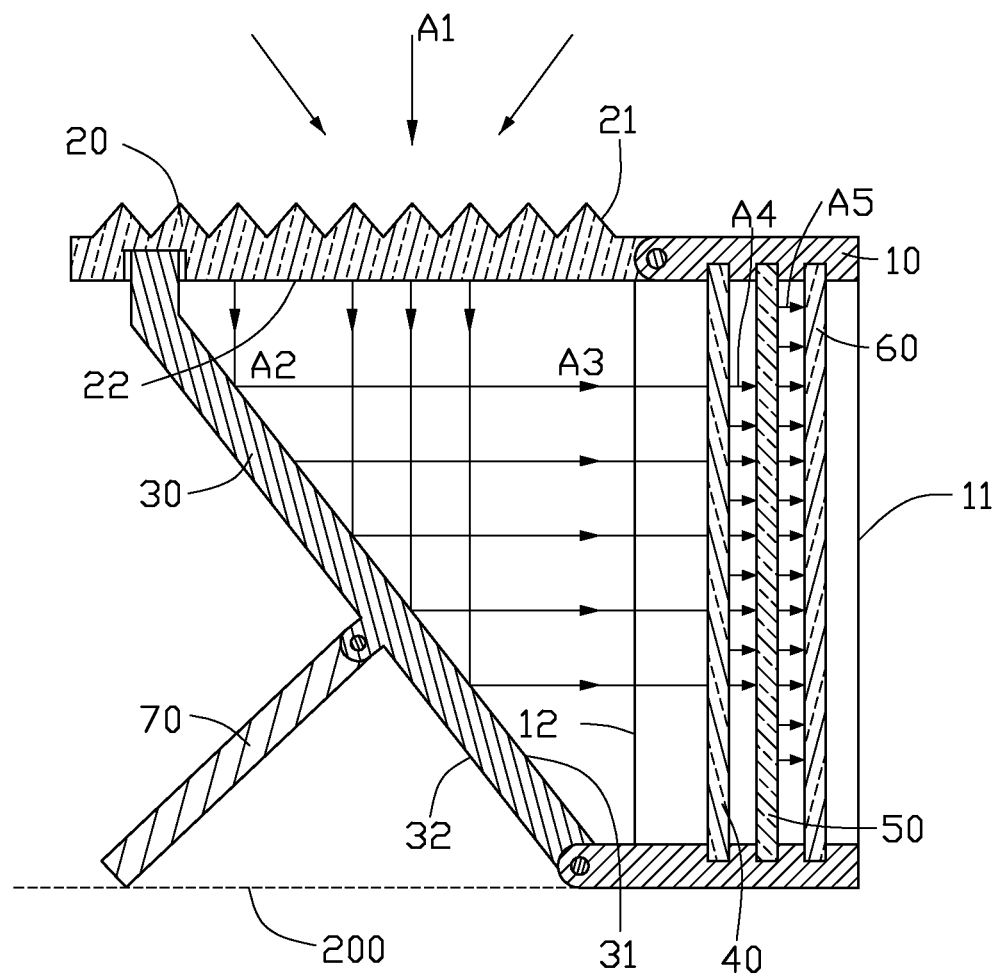
FIG. 3 is a schematic, cross-sectional view of the digital photo frame of FIG. 1, showing an optical path associated therewith.

Referring to FIG. 3, in use, the digital photo frame 100 is supported on a working surface 200. The light gathering lens array 20 is clockwise rotated to approximately parallel to the working surface 200. The reflector 30 is counterclockwise rotated to about 45 degrees with the working surface 200, and the flange 34 is engaged in the locating groove 221. One end of the support member 70 far away the support pivot pins 71 abuts against the working surface 200.

Sunlight rays or other ambient light rays A1 propagate to the incident surface 21. The light gathering lens array 20 condenses light rays A1 to light rays A2. Light rays A2 which are brighter than the light rays A1 transmits from the light gathering lens 20 and project to the reflecting surface 31. The reflector 30 reflects the light rays A2 to light rays A3. The light rays A3 pass the optical film layer array 40 and project to the diffuser 50 with light rays A4. The diffuser 50 diffuses the light rays A4 to light rays A5. The light rays A5 project to the transmissive LCD module 60 and is modulated by the transmissive LCD module 60, based upon video signals input to the transmissive LCD module 60, to display corresponding text, image, or video.

Figure 4:
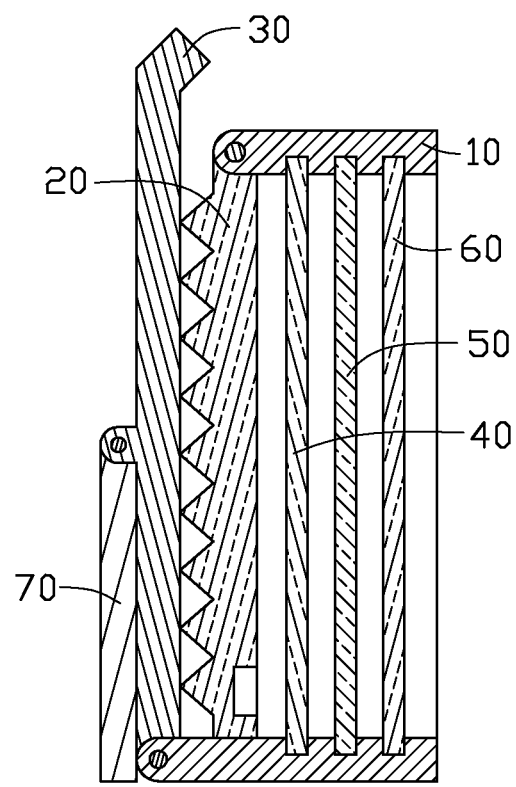
FIG. 4 is a schematic view of the digital photo frame of FIG. 1 in another state.

Referring also to FIG. 4, when the digital photo frame 100 is not used, the light gathering lens array 20 is rotated to received in the frame 10. The reflector 30 is rotated to close up to the light inputting surface 21. The digital photo frame 100 is folded to a cubical in shape so as to be taken along conveniently.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A digital photo frame comprising:
    a frame comprising a front side, a rear side, and a receiving hole through the front side and rear side;
    a light gathering lens array pivotally mounted on the rear side of the frame, the light gathering lens array being rotatable about two upper pivot pins; the light gathering lens array comprising a light emitting surface, the light gathering lens defining a locating groove in the light emitting surface;
    a reflector pivotally mounted on the rear side of the frame corresponding to the light gathering lens array, the reflector being rotatable about two lower pivot pins parallel to the upper pivot pins; the reflector comprising a flange for engagement in the locating groove; and
    a transmissive LCD module received in the receiving hole adjacent to the front side;
    wherein the reflector forms 45 degrees with the light gathering lens array and the transmissive LCD module respectively when the flange engages in the locating groove.

2. The digital photo frame in claim 1, further comprising an optical film layer array, the optical film layer array is received in the receiving hole adjacent to the rear side.

3. The digital photo frame in claim 2, further comprising a diffuser, the diffuser is received in the receiving hole, and is lay between the transmissive LCD module and the optical film layer array.

4. The digital photo frame in claim 1, further comprising a support member, the support member pivotally coupled to the reflector and configured for supporting the reflector.

5. The digital photo frame in claim 1, wherein the light gathering lens array is configured for condensing and directing light rays to the reflector.

6. The digital photo frame in claim 5, wherein the reflector is configured for reflecting the light rays from the light gathering lens array to the transmissive LCD module.

\* \* \* \* \*